United States Patent Office 3,655,762
Patented Apr. 11, 1972

3,655,762
9-AMINOALKYL-9-ALKYL- OR ARYL-
SULPHONYL-FLUORENES
Jean A. Gautier, Marcel Y. Miocque, Henri Moskowitz, and Janine L. Blanc-Guenee, Paris, Guy M. Raynaud, Meudon la Foret, and Nicole A. M. Dorme, Paris, France, assignors to Delalande S.A., Courbevoie, Hauts-de-Seine, France
No Drawing. Filed July 23, 1969, Ser. No. 844,209
Int. Cl. C07c 87/28
U.S. Cl. 260—570.8 TC
2 Claims

ABSTRACT OF THE DISCLOSURE

A compound of the formula

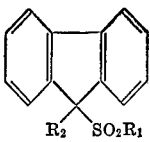

in which $R_1$ is a straight or branched chain aliphatic radical having 1 to 6 carbon atoms, or a phenyl or p-tolyl radical, and $R_2$ is a saturated or unsaturated, straight or branched chain aliphatic radical having 1 to 5 carbon atoms, which radical may carry a tertiary amino radical, such as a dialkylamino, morpholino or piperidino. The compound is obtained by reacting the corresponding fluorene with sodium amide and then reacting the resulting sodium derivative with a halogenide of the formula X—$R_2$, wherein X is a halogen. The compounds possess diuretic and analgesic properties.

---

The present invention relates to novel derivatives of 9-fluorenyl sulphone, their process of preparation and their utilization as medicaments.

The derivatives according to the invention correspond to the general formula:

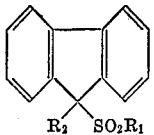

(1)

in which:

$R_1$ represents a straight or branched-chain aliphatic radical having 1 to 6 carbon atoms, or a phenyl or p-tolyl radical, and $R_2$ represents a saturated or unsaturated, straight or branched-chain aliphatic radical having 1 to 5 carbon atoms, which radical may carry a tertiary amino radical, such as a dialkylamino, morpholino or piperidino radical.

The process according to the invention comprises reacting, in a first stage, a fluorene of the general formula:

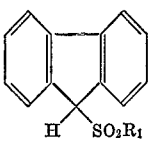

(2)

in which $R_1$ is as defined above, with sodium amide, the reaction being carried out in an appropriate solvent and, in a second stage, reacting the sodium derivative obtained with a halogenide of the general formula:

X—$R_2$ (3)

in which X represents a halogen atom and $R_2$ is as defined above, the derivative of the general Formula 1 being collected by usual means.

Preferably, the first stage of the reaction is carried out at ambient temperature in toluene or liquid ammonia, taking care in the case where the latter solvent is utilised, to remove it and replace it by toluene in order to proceed with the alkylation, and the second stage is carried out in toluene at the boiling point of the reaction medium for a period of between 3 and 10 hours.

The derivatives of the general Formula 1 so obtained, may be collected, for example, by decantation of the organic phase after cooling and taking up in water and recrystallization in an appropriate solvent.

Certain of the derivatives of the general Formula 2, in particular those in which $R_1$ represents a butyl radical or a $C_5$ or $C_6$-alkyl radical, are novel and have to be synthesised first.

The following preparations are given, by way of example, to illustrate the invention.

EXAMPLE 1

9-diethylaminoethyl-9-butylsulphonyl-fluorene

The following are prepared successively:

(a) 9-butylthio-fluorene;
(b) 9-butylsulphonyl-fluorene, and finally
(c) 9-diethylaminoethyl-9-butylsulphonyl-fluorene.

(a) 9-butylthio-fluorene.—0.28 mol of butanethiol is added to a solution of 0.25 mol of sodium methylate in 250 ml. of methanol, and the mixture is agitated for 10 minutes at ambient temperature. 0.25 mol of bromofluorene (in powder form) is then added to the mixture and the suspension is heated for 4 hours at 60–70° C. After cooling, water is added and the mixture is extracted with ether. On evaporation of the etherified phase, a red oil is obtained which is distilled.

Boiling point=170° C.
Viscosity $n_D^{21}$=1.6170
Yield=50%
Empirical formula=$C_{17}H_{18}S$

*Elementary analysis.*—Calculated (percent): C, 80.16; H, 7.13; S, 16.31. Found (percent): C, 80.29; H, 7.25; S, 12.44.

(b) 9-butylsulphonyl-fluorene.—0.25 mol of 9-butylthio-fluorene is dissolved in 150 ml. of glacial acetic acid and heated to 80–90° C. 150 ml. of 110 volume hydrogen peroxide is then added dropwise thereto over a period of 30 minutes. The reaction is lively and the mixture becomes turbid before the completion of the addition. After cooling, the mixture is poured into iced water. The product is dried and recrystallized in 95° ethanol.

Melting point=102° C.
Empirical formula=$C_{17}H_{18}O_2S$
Yield=50%

*Elementary analysis.*—Calculated (percent): C, 71.29; H, 6.34, O, 11.17; S, 11.10. Found (percent): C, 71.44; H, 6.51; O, 11.28; S, 11.00.

(c) 9-diethylaminoethyl-9-butylsulphonyl-fluorene.—A suspension of sodium amide (0.1 mol) in 150 ml. of anhydrous toluene is added to 0.1 mol of 9-butylsulphonyl-fluorene. The mixture is progressively heated and maintained under reflux for 3 hours. 0.1 mol of diethylamino chlorethane is then added, and the mixture is kept under reflux for a further 7 hours. After addition of 100 ml. of water, the toluenic phase is decanted and evaporated. The residue is recrystallized in isopropyl ether.

Melting point=73° C.
Empirical formula=$C_{23}H_{31}NO_2S$
Yield=52%

*Elementary analysis.*—Calculated (percent): C, 71.65; H, 8.10; N, 3.63; O, 8.30; S, 8.32. Found (percent): C, 71.90; H, 8.11; N, 3.38; O, 8.44; S, 8.03.

The compounds listed in the following Table I have been prepared by a similar procedure to that described above.

amide in liquid ammonia. The solution turns yellow. The mixture is agitated for 2 hours before adding 0.02 mol of propargyl bromide diluted in its own volume of anhydrous ether. The liquid ammonia is then progressively replaced with anhydrous toluene. The mixture is then maintained under reflux for 7 hours. After cooling and the addition of 50 ml. of water, the organic phase is separated and concentrated. A crude product is obtained which is recrystallized in isopropyl ether.

Melting point=188° C.
Empirical formula=$C_{22}H_{16}SO_2$
Yield=67%

*Elementary analysis.*—Calculated (percent): C, 76.72; H, 4.68; O, 9.29; S, 9.31. Found (percent): C, 76.78; H, 4.68; O, 9.26; S, 9.20.

TABLE I

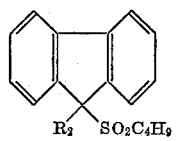

| $R_2$ | Yield, percent | M.P., °C. | Recrystallization solvent | Empirical formula | | C | H | N | O | S |
|---|---|---|---|---|---|---|---|---|---|---|
| —$CH_2C\equiv CH$ | 75 | 107 | $(isoPr)_2O$ | $C_{20}H_{20}SO_2$ | Calculated | 74.04 | 6.21 | | 9.86 | 9.88 |
| | | | | | Found | 74.08 | 6.21 | | 10.09 | 10.18 |
| —$CH_2CH_2N(CH_3)_2$ | 38 | 78 | $(C_4H_9)_2O$ | $C_{21}H_{27}NO_2S$ | Calculated | 70.55 | 7.61 | 3.92 | 8.95 | 8.97 |
| | | | | | Found | 70.60 | 7.71 | 4.15 | 9.11 | 9.10 |
| —$CH_2CH_2N(C_3H_7)_2$ | 75 | 108 | $(isoPr)_2O$ | $C_{25}H_{35}NO_2S$ | Calculated | 72.60 | 8.53 | 3.39 | 7.74 | 7.75 |
| | | | | | Found | 72.86 | 8.51 | 3.43 | 7.69 | 7.83 |
| —$CH_2CH_2N\!\!\bigcirc$ | 50 | 84 | $(isoPr)_2O$ | $C_{24}H_{31}NO_2S$ | Calculated | 72.50 | 7.86 | 3.52 | 8.05 | 8.07 |
| | | | | | Found | 72.48 | 7.87 | 3.32 | 8.34 | 7.97 |

EXAMPLE 2

9-propargyl-9-phenylsulphonyl-fluorene 0.02 mol of 9 - phenylsulphonyl - fluorene in powder form is added to a suspension of 0.02 mol of sodium The compounds listed in the following Tables II and III have been prepared by a similar procedure to that described above.

TABLE II

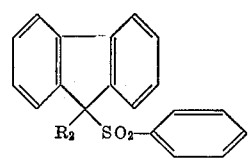

| $R_2$ | Yield, percent | M.P., °C. | Recrystallization solvent | Empirical formula | | C | H | N | O | S |
|---|---|---|---|---|---|---|---|---|---|---|
| —$CH_2CH_2N(CH_3)_2$ | 39 | 142 | $(C_4H_9)_2O$ | $C_{23}H_{23}NO_2S$ | Calculated | 73.18 | 6.14 | 3.71 | 8.48 | 8.49 |
| | | | | | Found | 73.54 | 6.08 | 3.58 | 8.77 | 8.17 |
| —$CH_2CH_2N(C_2H_5)_2$ | 70 | 134 | $(isoC_3H_7)_2O$ | $C_{25}H_{27}NO_2S$ | Calculated | 74.04 | 6.71 | 3.45 | 7.89 | 7.91 |
| | | | | | Found | 74.10 | 6.56 | 3.36 | 7.91 | 7.74 |
| —$CH_2CH_2N(iC_3H_7)_2$ | 50 | 118 | $C_2H_5OH$ [1] | $C_{27}H_{31}NO_2S$ | Calculated | 74.79 | 7.21 | 3.23 | 7.38 | 7.39 |
| | | | | | Found | 75.09 | 7.38 | 2.90 | 7.23 | 7.26 |
| —$CH_2CH_2N\!\!\bigcirc$ | 68 | 190 | $C_2H_5OH$ 95° | $C_{26}H_{27}NO_2S$ | Calculated | 74.78 | 6.52 | 3.35 | 7.66 | 7.68 |
| | | | | | Found | 74.55 | 6.70 | 3.20 | 7.57 | 7.53 |
| —$CH_2CH_2N\!\!\bigcirc\!\!O$ | 20 | 176 | $C_2H_5OH$ 95° | $C_{25}H_{25}NO_3S$ | Calculated | 71.57 | 6.01 | 3.34 | 11.44 | 7.64 |
| | | | | | Found | 71.42 | 6.06 | 3.12 | 11.64 | 7.70 |
| —$CH_2CH_2CH_2N(CH_3)_2$ | 30 | 200 | $C_2H_5OH$ 95° | $C_{24}H_{25}NO_2S$ | Calculated | 73.62 | 6.44 | 3.58 | 8.17 | 8.19 |
| | | | | | Found | 73.50 | 6.42 | 3.56 | 8.37 | 8.02 |
| —CH—$CH_2N(CH_3)_2$<br>\|<br>$CH_3$ | 54 | 120 | $(C_4H_9)_2O$ | $C_{24}H_{25}NO_2S$ | Calculated | 73.62 | 6.44 | 3.58 | 8.17 | 8.19 |
| | | | | | Found | 73.79 | 6.39 | 3.29 | 8.39 | 7.96 |

[1] Absolute.

TABLE III

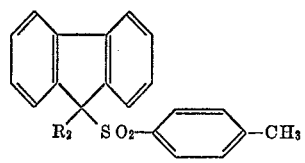

| $R_2$ | Yield, percent | M.P., °C. | Recrystallization solvent | Empirical formula | Elementary analysis, percent | | | | |
|---|---|---|---|---|---|---|---|---|---|
| | | | | | | C | H | N | O | S |
| $-CH_2-C\equiv CH$ | 56 | 204 | $C_2H_5OH$ | $C_{23}H_{18}SO_2$ | Calculated | 77.06 | 5.06 | ----- | 8.93 | 8.95 |
| | | | | | Found | 76.95 | 5.09 | ----- | 8.89 | 8.95 |
| $-CH_2CH_2N(CH_3)_2$ | 70 | 146 | $(C_4H_9)_2O$ | $C_{24}H_{25}NO_2S$ | Calculated | 73.62 | 6.44 | 3.58 | 8.17 | 8.19 |
| | | | | | Found | 73.86 | 6.55 | 3.78 | 8.40 | 8.02 |
| $-CH_2CH_2N(C_2H_5)_2$ | 60 | 120 | $(C_4H_9)_2O$ | $C_{26}H_{29}NO_2S$ | Calculated | 74.42 | 6.97 | 3.34 | 7.63 | 7.64 |
| | | | | | Found | 74.68 | 7.17 | 3.03 | 7.73 | 7.93 |
| $-CH_2CH_2N(iC_3H_7)_2$ | 67 | 130 | $(C_4H_9)_2O$ | $C_{28}H_{33}NO_2S$ | Calculated | 75.13 | 7.43 | 3.13 | 7.15 | 7.16 |
| | | | | | Found | 74.96 | 7.55 | 2.97 | 7.33 | 7.32 |
| $-CH_2CH_2N\hexagon$ | 71 | 161 | $(C_4H_9)_2O$ | $C_{27}H_{29}NO_2S$ | Calculated | 75.14 | 6.77 | 3.25 | 7.41 | 7.43 |
| | | | | | Found | 75.06 | 6.85 | 2.96 | 7.51 | 7.46 |
| $-CH_2CH_2N\hexagon O$ | 35 | 161 | $(C_4H_9)_2O$ | $C_{26}H_{27}NO_2S$ | Calculated | 78.02 | 6.28 | 3.23 | 11.07 | 7.40 |
| | | | | | Found | 71.89 | 6.11 | 3.22 | 11.10 | 7.38 |
| $-CH_2CH_2CH_2N(CH_3)_2$ | 50 | 136 | $(C_4H_9)_2O$ | $C_{25}H_{27}NO_2S$ | Calculated | 74.04 | 6.71 | 3.45 | 7.89 | 7.91 |
| | | | | | Found | 74.07 | 6.66 | 3.25 | 8.05 | 7.90 |
| $-CH(CH_3)-CH_2N(CH_3)_2$ | 50 | 108 | Heptane | $C_{25}H_{27}NO_2S$ | Calculated | 74.04 | 6.71 | 3.45 | 7.89 | 7.91 |
| | | | | | Found | 73.85 | 6.83 | 3.53 | 7.88 | 7.97 |

The compounds of the general Formula 1 have been tested on laboratory animals and have been shown to possess diuretic and analgesic properties.

(1) Diuretic properties.—The oral administration of the compounds of Formula 1 together with an excess of an isotonic solution of sodium chloride regularly produces increased diuresis in a group of rats with respect to reference animals receiving only the excess of an isotonic solution of sodium chloride.

By way of example, the results obtained with certain of the compounds of the general Formula 1 are given in the following Table IV.

TABLE IV

| $R_1$ | $R_2$ | Dose administered, mg./kg./p.o. | Augmentation of diuresis, percent |
|---|---|---|---|
| —⬡—$CH_3$ | $-CH_2-CH_2-N\hexagon$ | 10 | 95 |
| —⬡—$CH_3$ | $-CH_2-C\equiv CH$ | 10 | 75 |
| —⬡—$CH_3$ | $-CH_2-CH_2-N(CH_3)_2$ | 10 | 55 |
| —⬡ | $-CH_2-CH_2-N\hexagon$ | 10 | 65 |
| —⬡ | $-CH_2CH_2-N\hexagon O$ | 10 | 48 |
| —⬡ | $-CH(CH_3)-CH_2-N(CH_3)_2$ | [1] 5 / [1] 10 | 85 / 125 |

[1] This augmentation concerns only the elimination of water, Cl⁻ and Na⁺ ions, as K⁺ ions remains practically unchanged.

(2) Analgesic properties.—The oral administration of the compounds of Formula 1 to mice reduces the number of painful stretchings provoked by the intraperitoneal injection of a solution of acetic acid.

By way of example, the results obtained with two of the compounds of Formula 1 are given in the following Table V.

TABLE V

| $R_1$ | $R_2$ | Dose administered, mg./kg./p.o. | Amount of protection, percent |
|---|---|---|---|
| —C₆H₄—CH₃ | —CH₂—C≡CH | 100 | 50 |
| —C₆H₄—CH₃ | —CH₂—CH₂—N(CH₃)₂ | 100 | 50 |

Considering the results shown in the following Table VI and those shown in the preceding Tables IV and V, the difference between the lethal dose and the pharmacologically active dose of the compounds of Formula 1 is sufficiently large to permit the use of the aforesaid compounds in therapeutics.

TABLE VI

| $R_1$ | $R_2$ | Dose administered to mice | Percentage mortality, percent |
|---|---|---|---|
| —C₆H₄—CH₃ | —CH₂—CH₂—N(morpholine/piperidine) | 2 g./kg./p.o. | 0 |
| —C₆H₄—CH₃ | —CH₂—C≡CH | 2 g./kg./p.o. | 0 |
| —C₆H₄—CH₃ | —CH₂—CH₂—N(CH₃)₂ | 1.5 g./kg./p.o. | 50 |
| —C₆H₅ | —CH₂—CH₂—N(piperidine) | 2 g./kg./p.o. | 0 |
| —C₆H₅ | —CH₂—CH₂—N(morpholine) | 2 g./kg./p.o. | 0 |
| —C₆H₅ | —CH(CH₃)—CH₂—N(CH₃)₂ | 500 mg./kg./p.o. | 50 |

The derivatives of 9-fluorenyl sulphone may be employed in the treatment of the oedema, the hydrosodic retention particularly observed in cases of cardiac and hepatic deficiencies as well as in nephrotic syndromes. They are equally effective in the symptomatic treatment of various algias.

They may be administered in the form of tablets containing 10 to 250 mg. of active ingredient.

What we claim is:

1. A compound according to claim 2, in which $R_1$ is phenyl and $R_2$ is

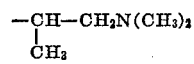

2. A compound of the formula

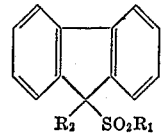

wherein
  $R_1$ is butyl, phenyl or p-tolyl, and
  $R_2$ is dimethylaminoethyl, diethylaminoethyl, dipropylaminoethyl, diisopropylaminoethyl, dimethylaminopropyl or dimethylaminoisopropyl.

References Cited

UNITED STATES PATENTS 3,325,544   6/1967   Moffett _____ 260—570.8

OTHER REFERENCES

Burger, "Medicinal Chemistry," 2nd ed., pp. 82–83 (1960).

ROBERT V. HINES, Primary Examiner

U.S. Cl. X.R.

260—247.1, 293.4 C, 293.4 D, 293.4 G, 607 B, 609 R; 424—248, 267, 330, 337